Jan. 13. 1925. 1,522,810
H. S. DICKINSON
SAFETY DEVICE FOR TRACTORS
Filed April 14, 1921 2 Sheets-Sheet 2
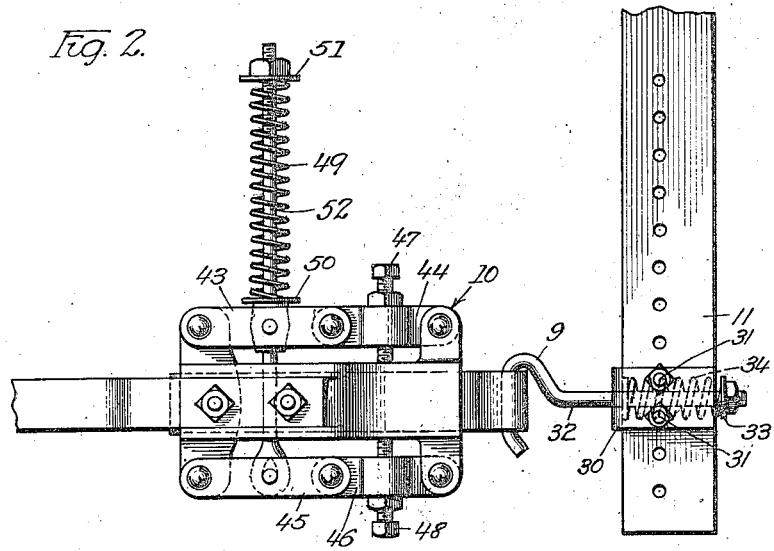
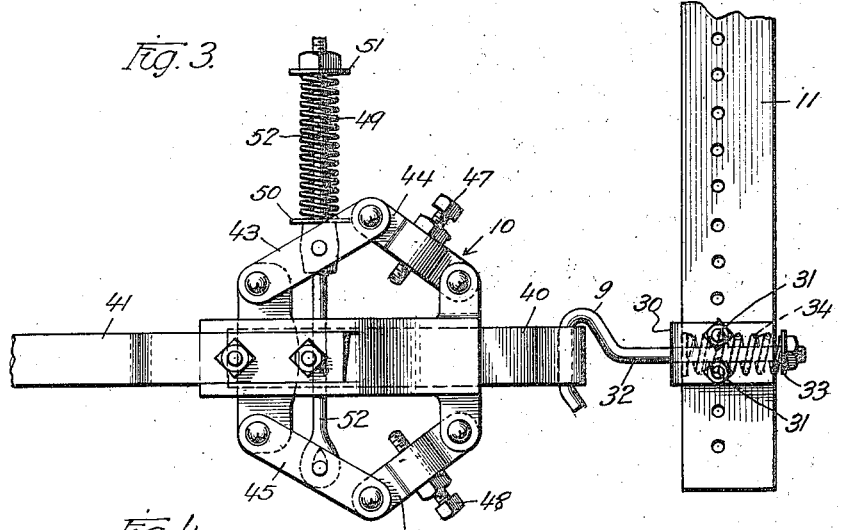
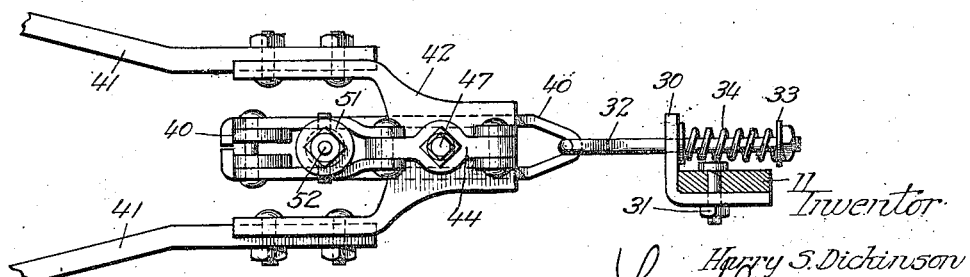

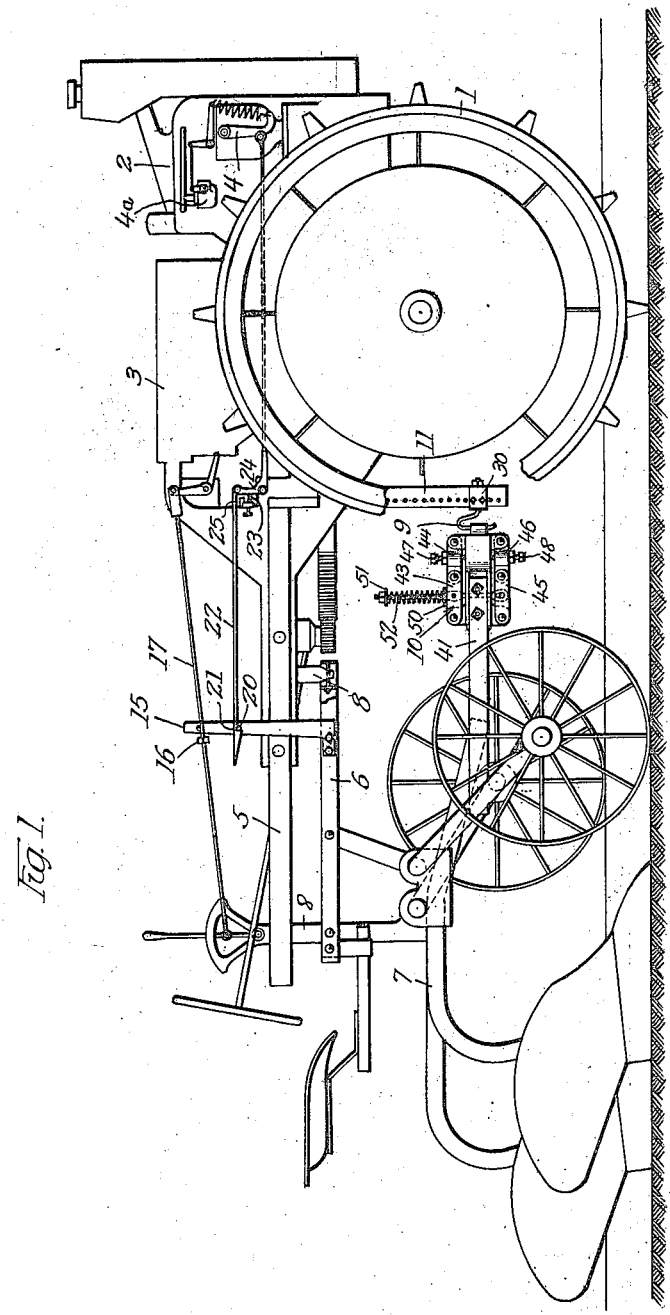

Patented Jan. 13, 1925.

1,522,810

UNITED STATES PATENT OFFICE.

HARRY S. DICKINSON, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

SAFETY DEVICE FOR TRACTORS.

Application filed April 14, 1921. Serial No. 461,338.

*To all whom it may concern:*

Be it known that I, HARRY S. DICKINSON, a citizen of the United States, residing at Moline, county of Rock Island, State of Illinois, have invented certain new and useful Improvements in Safety Devices for Tractors, of which the following is a specification.

The invention relates to safety devices for tractors.

Tractors that are now used extensively for drawing agricultural implements and the like sometimes have more power available for drawing the implement than is required. If the implement strikes an obstruction, or if it is being pulled through heavy ground, a condition may arise where the tractor will exert more power for pulling the implement than the implement will stand. The result is that the implement itself is damaged or destroyed. It is accordingly desirable to have some means for automatically stopping the tractor when the draft on the implement exceeds a predetermined value. The present invention is directed to a solution of this problem.

One of the objects of the invention is to provide an automatic means for stopping a tractor when the draft exerted on an implement exceeds a predetermined value.

A further object is to provide an automatic means for first slightly increasing the pull of the tractor when the implement being drawn meets an obstruction and then automatically stopping the tractor after the pull required exceeds a predetermined value.

A further object is to provide a draft device of minimum size that will automatically trip out when the pull thereon exceeds a predetermined amount.

Other objects and advantages of the invention will appear from the specification and drawings.

One embodiment of the invention is illustrated in the accompanying drawings in which, Figure 1 is a side view of the tractor with the invention applied thereto.

Figure 2 is a side view of a draft device showing it in the normal position for pulling a load.

Figure 3 is a side view of the draft device showing it in a tripped position.

Figure 4 is a plan view of the draft device.

The device, as shown, is applied to a two wheel tractor of the unstable type having drive wheels 1, a power plant 2, clutch mechanism (not shown) enclosed in a housing 3 and a governor 4 controlling a throttle $4^a$.

The tractor is connected to the implement to be drawn through the medium of a coupling frame 5 to which is attached a connecting bar 6 carried by the implement 7. The coupling frame serves to stabilize the tractor and permits it to be steered. The connecting bar 6 of the implement is connected to the coupling frame 5 through brackets arranged to receive pins carried by the bar 6, such connection permitting the implement to swing about a substantially horizontal axis and also permitting it to move longitudinally relative to the tractor.

The draft of the tractor is transmitted to the implement through draft connections 9 and 10 connected to a tractor draft bar 11 as illustrated in Figure 1. These draft connections are constructed so that when the pull of the tractor exceeds a predetermined amount, the tractor will move forward relative to the implement a short distance and automatically trip out the clutch. It sometimes happens that a slight increase in the pull of the tractor will pull the implement without damage over or through an obstruction and, in such a case, it is desirable to have the tractor exert this increased pull. Consequently, there has been provided a means which first automatically opens the throttle of the tractor slightly when the implement encounters an obstruction, and then, if the implement is not pulled over that obstruction as the power is increased, the clutch is automatically tripped out and the throttle returned to normal position.

The clutch is tripped out through the medium of a member 15 adapted to engage a projection or collar 16 carried by the clutch control rod 17. The member 15 is carried by the connecting bar 6 of the implement and consequently moves with the implement. When the draft exerted increases so that the draft connection permits relative movement of the implement and tractor, the tractor together with the control rod 17 moves forward relative to the implement and the member 15 until the collar 16 engages the member 15, whereupon further movement of the control rod is prevented. The continued forward movement of the tractor then causes a pull to be exerted on rod 17 which throws out the clutch.

The automatic throttle control is also obtained by using the member 15 which carries a projection 20 engaging a notch 21 of the throttle control lever 22 which is normally biased by a spring 23 to its operative position. The first movement of the tractor relative to the implement tends to carry the throttle control rod 21 forward but the rod is held by the projection 20. The bell crank lever 24 is consequently moved against the tension of spring 23 to open the throttle. The tension of the spring 23 becomes greater as the throttle is opened further and the notch in the control lever 22 is shaped so that when the spring has been tensioned a predetermined amount, the lever will automatically rise over the projection 20 and permit the spring 23 to return the throttle to its normal position. This action occurs at approximately the same time as the clutch is tripped out if the clutch trip mechanism is used in combination with the throttle control. In order to insure that the throttle control rod will ride up over projection 20, a stop 25 is provided against which the bell crank lever contacts if the spring 23 does not give the desired action.

Two types of draft connections for connecting the implement with the draw-bar 11 of the tractor are illustrated in Figures 2, 3, and 4. One type is especially suitable for use with the clutch trip-out and the other type is suitable for use with both clutch trip-out and the throttle control. The latter will be first described.

The spring draft device includes an angle member 30 adapted to be fastened to the draw-bar 11 by means of bolts 31 or the like, a draft rod 32 having a nut and washer 33 on one end thereof and a spring 34 between the nut and washer and the angle member 30. The construction is clearly illustrated in Figure 4.

This draft connection is, in effect, a spring connection and it permits the tractor to move forward relative to the implement an amount depending upon the draft exerted. The relative movement begins when the draft exceeds a predetermined value. The point at which the movement begins depends upon the strength of the spring and the adjustment of the nut 33.

This draft device is especially suitable when the throttle control is used because it may be adjusted so that, as soon as the draft exceeds a predetermined value, which is less than the danger point, the tractor moves forward relative to the implement and opens the throttle. If the draft does not exceed this amount, the clutch will not be tripped out, but if it does exceed it, the clutch will be disengaged as previously explained.

An additional draft trip is illustrated which trips out suddenly. It is especially useful where only a small relative movement of the tractor and implement are permissible. It includes a draft member 40 adapted to be attached by means of a link to the draft-bar 11 of the tractor. It is shown in the drawings as connected to the draft-bar through the spring draft device previously described but it is to be understood that the two are not necessarily to be used together and that the member 40 may be connected to the draft-bar 11 by any suitable form of link. The draft device also includes the member 41 adapted to be attached to the implement. This member has attached to it a yoke 42 which telescopes over the member 40. Toggle links 43, 44, 45 and 46 connect the forward end of the member 42 with the rear end of the member 40, suitable projections being provided on each part to which the toggle links are pivoted. The normal position of the toggle links is as shown in Figure 2 in which the centers are in substantial alignment. The position of the links may be varied by set screws 47 and 48 which prevent the links from swinging inwardly and normally should set them so that the center pivot is approximately in line with the end pivots.

The toggle links are normally biased to their straightened position by means of the spring 49, one end of which bears against the washer 50 engaging the link 43 and the other end of which engages against a nut and washer 51 carried by a rod 52 connected to the link 45. The strength of this spring may be varied by adjusting the nut 51. With this construction the draft is transmitted through the toggle links in their aligned position. The links are set so that the component of the draft tending to swing them outwardly is relatively small but is such that when the draft exceeds a predetermined amount the links will move against the tension of the spring. As soon as they have moved slightly out of line, the component of the draft tending to break the links increases very rapidly. As a matter of fact, in practical operation, the draft device actually opens very suddenly when the draft exceeds a predetermined amount.

When this draft device trips, the tractor moves forward relative to the implement and trips out the clutch as hereinafter described. In order to reset the draft device it is only necessary to reverse the tractor which, in the event the implement encounters an obstruction, would be desirable any way. Consequently, when the tractor is backed, the draft device automatically sets itself and if the obstruction is then removed, the tractor can be driven ahead without requiring that any attention be paid to the draft connection.

The subject matter relating to the automatic acceleration of the tractor has been made the subject of a separate application, Serial No. 743,588, filed October 3, 1924.

It is to be understood that variations can be made in the construction shown without departing from the spirit and scope of the invention as defined in the appended claims.

What I claim is:

1. A spring trip draft device for tractors comprising a member adapted to be attached to a tractor draw-bar, a member to be attached to an implement, a pair of toggle links connecting and transmitting the draft between said members, and means for retaining said toggle links in approximately dead center position until the draft transmitted exceeds a predetermined value.

2. A spring trip draft device for tractors comprising a member adapted to be attached to a draw bar, a member adapted to be attached to an implement, a pair of toggle links connecting and transmitting the draft between said members and spring mechanism for maintaining said toggle links in substantial dead center position until the pull transmitted exceeds a predetermined value.

3. A trip draft device comprising a member adapted to be attached to a draw bar, a member adapted to be attached to an implement, a pair of toggle links between said members, means for adjusting the position of the toggle links when straightened out, and an adjustable spring mechanism for normally maintaining said links in straightened position and arranged to maintain them in such position until the pull transmitted exceeds a predetermined value.

4. A releasable hitch comprising a member adapted to be attached to a tractor, a member to be attached to an implement, said members being movable relative to one another longitudinally in the line of draft, a pair of toggle links connecting and transmitting the draft between said members, said toggle links being normally located longitudinally and substantially parallel to the line of draft but adapted to be broken in a direction at right angles to the line of draft when the draft exceeds a predetermined value, and adjustable means for varying the position of the toggle links to vary the force required to break the connection.

5. A releasable hitch for tractors having a member adapted to be attached to a tractor, a member for attachment to an implement to be drawn, and mechanism unyieldingly connecting the members together but serving, when the draft exceeds a predetermined value, to permit a sudden, limited, relative movement thereof without separating said members.

6. A releasable hitch for tractors comprising a member adapted to be attached to a tractor, a member for attachment to an implement to be drawn, means connecting said members together unyieldingly but permitting them, when the draft exceeds a predetermined value, to suddenly move relative to one another but not to separate, the members being so constructed that when they are moved in a reverse direction, as by backing a tractor, they may be returned to their original position without being manually realigned.

7. A draft device for tractors comprising a member adapted to be attached to a tractor, a member for attachment to an implement to be drawn, and means unyieldingly connecting the members together but permitting them to move suddenly relative to one another when the draft exceeds a predetermined value, said mechanism being constructed and associated with said members so that the draft device will be automatically reset when the members are moved in the reverse position as by backing the tractor.

8. The combintaion with a tractor of a drawn device, draft connections between the tractor and drawn device having members unyieldingly connected together to normally transmit the draft of the tractor to the drawn device, said members being arranged to suddenly release and move relative to one another when the draft exceeds a predetermined value, and means for automatically stopping the tractor when the members release.

9. The combination with a tractor of an implement to be drawn thereby, a draft device having members unyieldingly connected together so as to normally transmit the draft of the tractor to the implement but arranged to release and move relative to one another when the draft exceeds a predetermined value, said draft device and members being constructed so that the members can move a limited amount wthout being separated from one another, and means for automatically stopping the tractor when the draft device releases and before the draft members have reached the end of their relative movement.

10. The combination with a tractor, of an implement to be drawn thereby, a draft device having members unyieldingly connected together so as to normally transmit the draft of the tractor to the implement but arranged to release and move relative to one another when the draft exceeds a predetermined value, said draft device and members being constructed so that the members can move a limited amount without being separated from one another, and means for automatically stopping the tractor when the draft device releases and before the draft members have reached the end of their relative movement, said tractor stopping means being constructed so that the tractor may be backed to push the draft members back to their orginal position.

11. The combination with a tractor havin a clutch, of an implement to be drawn thereby, a draft device having members unyieldingly connected together to normally transmit the draft of the tractor to the implement but arranged to suddenly release and move relative to one another when the draft exceeds a predetermined value, said draft device and members being constructed so as to have a limited relative movement before being separated, and means for automatically disengaging the tractor clutch when the draft device releases to thereby automatically stop the tractor before the draft members have reached the limit of their movement, said clutch releasing mechanism being constructed so that the clutch may be again engaged to back the tractor to move the members to their original position.

12. The combination with a two wheel tractor having a rearwardly extending coupling frame and controlling mechanism, of an implement connected to said frame, a draft device having members unyieldingly connected together to transmit the draft of the tractor to the implement but serving to suddenly release and move relative to one another when the draft exceeds a predetermined value, thereby permitting the tractor to move longitudinally relative to the implement, and means carried by the implement cooperating with the controlling mechanism of the tractor to automatically stop the tractor when the draft mechanism releases and permits the tractor to move longitudinally relative to the implement.

13. The combination with a two wheel tractor having a rearwardly extending coupling frame and a clutch with a controlling mechanism therefor, of an implement connected to said frame so that the tractor and implement may move a limited amount longitudinally relative to one another, a draft device connecting the implement and tractor, said draft device having members unyieldingly connected together, but serving to suddenly release and move relative to one another when the draft exceeds a predetermined value to thereby permit the tractor to move longitudinally relative to the implement, and means carried by the implement cooperating with the clutch controlling mechanism to automatically disengage the clutch to stop the tractor when the draft device releases, said means permitting the clutch to be engaged after the tractor has been stopped so that the tractor may be backed to reset the draft device.

In testimony whereof, I affix my signature.

HARRY S. DICKINSON.